(12) United States Patent
Harris et al.

(10) Patent No.: US 12,459,434 B2
(45) Date of Patent: Nov. 4, 2025

(54) ACTUATOR, REAR VIEW DEVICE AND VEHICLE

(71) Applicant: MOTHERSON INNOVATIONS COMPANY LIMITED, London (GB)

(72) Inventors: Tom Harris, Portchester (GB); Jiayong Dong, Ningbo (CN); David Kershaw, Portchester (GB); Gareth Aspden, Portchester (GB); Stephen Beecher, Portchester (GB); Levente Kurti, Portchester (GB); Warwick Jones, Portchester (GB); Dong Myeong Park, Portchester (GB); Ronglong Lin, Ningbo (CN)

(73) Assignee: Motherson Innovations Company Limited, London (GB)

( * ) Notice: Subject to any disclaimer, the term of this patent is extended or adjusted under 35 U.S.C. 154(b) by 22 days.

(21) Appl. No.: 18/403,949

(22) Filed: Jan. 4, 2024

(65) Prior Publication Data
US 2024/0253562 A1    Aug. 1, 2024

(30) Foreign Application Priority Data
Jan. 27, 2023  (DE) .................... 10 2023 102 059.5

(51) Int. Cl.
*F16H 55/22* (2006.01)
*B60R 1/074* (2006.01)

(52) U.S. Cl.
CPC .................... *B60R 1/074* (2013.01)

(58) Field of Classification Search
CPC ... B60R 1/074; B60R 1/06; B60R 2001/1253; A47G 1/1613; A47G 1/1626;
(Continued)

(56) References Cited

U.S. PATENT DOCUMENTS 6,257,731 B1 * 7/2001 Oh .................... B60R 1/074
359/872
7,137,715 B2 * 11/2006 Schuurmans ............. B60R 1/06
248/479

(Continued)

FOREIGN PATENT DOCUMENTS

WO    WO 2022/069737    4/2022

OTHER PUBLICATIONS

German Patent Office, Appl. 10 2023 102 059.5 Office Action, May 31, 2023.

*Primary Examiner* — Terrell L Mckinnon
(74) *Attorney, Agent, or Firm* — Jones Day

(57) ABSTRACT

The present disclosure refers to an actuator for rotating a head of a rear view device of a motor vehicle about two axes relative to a base of the rear view device, the actuator comprising: a gear assembly comprising: a fold gear configured to rotate the mirror head in a first direction and a second direction about a first axis, wherein the fold gear comprises an opening, in particular in form of a bore or a through hole; a tilt gear configured to rotate the mirror head in a third direction and a fourth direction about a second axis, wherein the tilt gear comprises an opening, in particular in form of a bore or a thorough hole; a spindle having a first end and a second end; a slide attached to the spindle via a channel; wherein the opening of the tilt gear receives the first end of the spindle and the opening of the fold gear receives the second end of the spindle; a housing enclosing the gear assembly, wherein the housing is configured to rotate with the head in the first direction, the second direction, the third direction and the fourth direction; and a shaft configured to be fixed on the base and configured to remain stationary, wherein the shaft provides at least one end stop (Continued)

configured to define a maximum rotation of the head in the first direction and in the second direction.

12 Claims, 18 Drawing Sheets

(58) Field of Classification Search
CPC .......... A47G 1/164; A47G 1/202; A47G 1/24; B60Q 1/0023; B60Q 1/2615; B60Q 1/06; F16H 55/22
USPC ...................... 248/476, 475.1, 479, 485, 487
See application file for complete search history.

(56) References Cited

U.S. PATENT DOCUMENTS

| | | | | |
|---|---|---|---|---|
| 8,366,285 B2 * | 2/2013 | Reedman | ................ | B60R 1/074 |
| | | | | 248/479 |
| 8,919,973 B2 * | 12/2014 | Schmierer | ................ | B60R 1/06 |
| | | | | 248/479 |
| 10,077,001 B2 * | 9/2018 | Casals | ..................... | B60R 1/074 |
| 11,377,032 B2 * | 7/2022 | Harris | ..................... | B60R 1/074 |
| 12,134,350 B2 * | 11/2024 | Harris | ..................... | B60R 1/074 |
| 2006/0119960 A1 | 6/2006 | Yoshida | | |
| 2012/0145871 A1 * | 6/2012 | Kawanishi | ............. | B60R 1/076 |
| | | | | 248/479 |
| 2018/0257571 A1 * | 9/2018 | De Wind | ................ | B60R 1/062 |
| 2019/0039522 A1 * | 2/2019 | Foote | ..................... | B60R 1/076 |
| 2021/0046875 A1 * | 2/2021 | Harris | ..................... | B60R 1/072 |
| 2022/0176878 A1 | 6/2022 | Harris et al. | | |
| 2023/0009664 A1 * | 1/2023 | Esser | ..................... | B60R 1/074 |
| 2023/0158954 A1 * | 5/2023 | Van Stiphout | .......... | B60R 11/04 |
| | | | | 248/487 |
| 2023/0278495 A1 * | 9/2023 | Beecher | .................. | F16H 55/22 |
| | | | | 248/542 |
| 2024/0253562 A1 * | 8/2024 | Harris | ..................... | B60R 1/072 |
| 2025/0083600 A1 * | 3/2025 | Kurti | ......................... | F16H 1/24 |
| 2025/0108758 A1 * | 4/2025 | Harris | ..................... | B60R 1/062 |

* cited by examiner

ACTUATOR, REAR VIEW DEVICE AND VEHICLE

CROSS-REFERENCE TO RELATED APPLICATION

This application claims priority to German Patent Application No. DE 10 2023 102 059.5, filed on Jan. 27, 2023, the entirety of which is incorporated herein by reference.

FIELD

The present disclosure relates to an actuator for rotating a head of a rear view device of a motor vehicle about two axes relative to a base of the rear view device, in particular for folding and field of view adjustment; it also refers to a rear view device with such an actuator and a vehicle with such a rear view device.

BACKGROUND

The statements in this section merely provide background information related to the present disclosure and may not constitute prior art.

Vehicles are required to have a rear view system that is operable to provide a driver of the vehicle a rearward field of view. The rear view system typically includes one or more components that are required to be actuated relative to the vehicle body along a first axis, such components may include mirrors or cameras. As an example, the actuation of components along a first axis may provide the driver of the vehicle the ability to fine tune the rearward field of view provided by the rear view system.

Further, some rear view systems provide actuation of one or more components along a second axis, such components may include mirrors or cameras. As an example, the actuation of components along a secondary axis allows the components to be stored closer to the vehicle body in certain conditions. Generally, actuation of components in a rear view system along a secondary axis is achieved using a secondary actuator.

Electromechanical actuators are typically used to rotate the components relative to the vehicle body. However, existing electromechanical actuators may be noisy, heavy, and large in size and often require high strength metallic parts (e.g., gearing) due to high shock loads acting on a gear train during impacts, thereby making the actuators heavier and costlier.

The use of a single actuator to provide adjustment of components along multiple axes allows for adjustment along a second axis which can reduce rear view system design cost and complexity.

Conventional actuators usually include gearing mechanism having more than one gear. To obtain proper gear engagement and to avoid any dislocation of the gears with respect to one another, biasing members are used to keep the gears in place. This makes the design of the gear complex and leads to high production cost of the gear.

One such actuator is disclosed in WO 2022/069737. The known actuator makes usage of a gear assembly having a biasing element positioned within the body of the gear assembly along the axis of rotation of the gear assembly. This makes the gear design complex and costly.

One of the important requirements in actuator systems is the mechanism for restricting the movement of the actuator that defines the limitation in which the actuator rotates. Designing such a restricting mechanism also plays an important role in overall actuator performance.

It is an object of the present disclosure to provide an actuator for rotating a head of a rear view device of a motor vehicle about two axes relative to a base of the rear view device, with the actuator overcoming the drawbacks of the prior art. In particular it is an object to provide the actuator with a simple structure in a cost effective manner. It is also an object to provide the actuator with a simple restricting mechanism that defines the limitation in which the actuator rotates.

SUMMARY

The present disclosure provides an actuator for rotating a head of a rear view device of a motor vehicle about two axes relative to a base of the rear view device, the actuator comprising: a gear assembly comprising: a fold gear configured to rotate the mirror head in a first direction and a second direction about a first axis, wherein the fold gear comprises an opening, in particular in form of a bore or a through hole; a tilt gear configured to rotate the mirror head in a third direction and a fourth direction about a second axis, wherein the tilt gear comprises an opening, in particular in form of a bore or a through hole; a spindle having a first end and a second end; and a slide attached to the spindle via a channel, wherein the opening of the tilt gear receives the first end of the spindle and the opening of the fold gear receives the second end of the spindle; a housing enclosing the gear assembly, wherein the housing is configured to rotate with the head in the first direction, the second direction, the third direction and the fourth direction; and a shaft configured to be fixed on the base and configured to remain stationary, wherein the shaft provides at least one end stop configured to define the maximum rotation of the head in the first direction and in the second direction.

The gear assembly of the actuator of the present disclosure is simple and cost effective. The gear assembly does not include any biasing member or any additional part to be inserted within the body of the fold gear and/or the tilt gear. This configuration not only makes the gear design simple but also makes the assembly of the gears simple and cost effective. Further, the fold gear and tilt gear have only openings, which may be in form of through holes for receiving the spindle, and thus a simple tool for making the openings in the fold gear and the tilt gear may be used. Thus, the cost of producing the fold gear and/or the tilt gear is highly reduced.

In an embodiment the slide includes a tilt end and a fold end, with the tilt end being configured to abut the tilt gear thereby fixing an axial position of the tilt gear along a length of the spindle to maintain a meshing between the tilt gear and a tilt drive, and with the fold end being configured to abut the fold gear thereby fixing an axial position of the fold gear along the length of the spindle to maintain a meshing between the fold gear and a fold drive.

In an embodiment the end stop is comprised by the shaft and/or is disposed on a side wall of the shaft.

In an embodiment the end stop has a first side wall, a second side wall, a third side wall, in particular between the first and second side walls, and a bottom wall, with preferably the first side wall, the second side wall and the bottom wall having flat surfaces and the third side wall having a curved surface.

In an embodiment the end stop is configured to be disposed in a slot of a shroud, with the shroud being configured to be attached to the housing of the actuator to rotate with the housing.

In an embodiment the slot of the shroud has a first wall and a second wall, with the first and second walls of the slot being configured to restrict the rotation of the shroud relative to the end stop.

In an embodiment the tilt gear, the slide and the fold gear are mounted on the spindle adjacent to each other, and the tilt gear, the slide and the fold gear are in direct contact with the spindle along the length of the spindle.

The present disclosure also provides a rear view device having a head, a base, a shroud and an actuator according to the present disclosure.

In an embodiment the head is configured to rotate with the housing of the actuator about two axes and the base is configured to remain stationary.

Further, with the present disclosure a vehicle with at least one rear view device of the present disclosure is provided, with the base being fixedly attached to the vehicle.

It should be noted that the features set out individually in the following description can be combined with each other in any technically advantageous manner and set out other forms of the present disclosure. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number. The description further characterizes and specifies the present disclosure in particular in connection with the Figures.

Other aspects, advantages, and salient features of the present disclosure will become apparent to those skilled in the art from the following detailed description, which taken in conjunction with the annexed figures, discloses exemplary embodiments of the disclosure.

DETAILED DESCRIPTION

Figure 1:
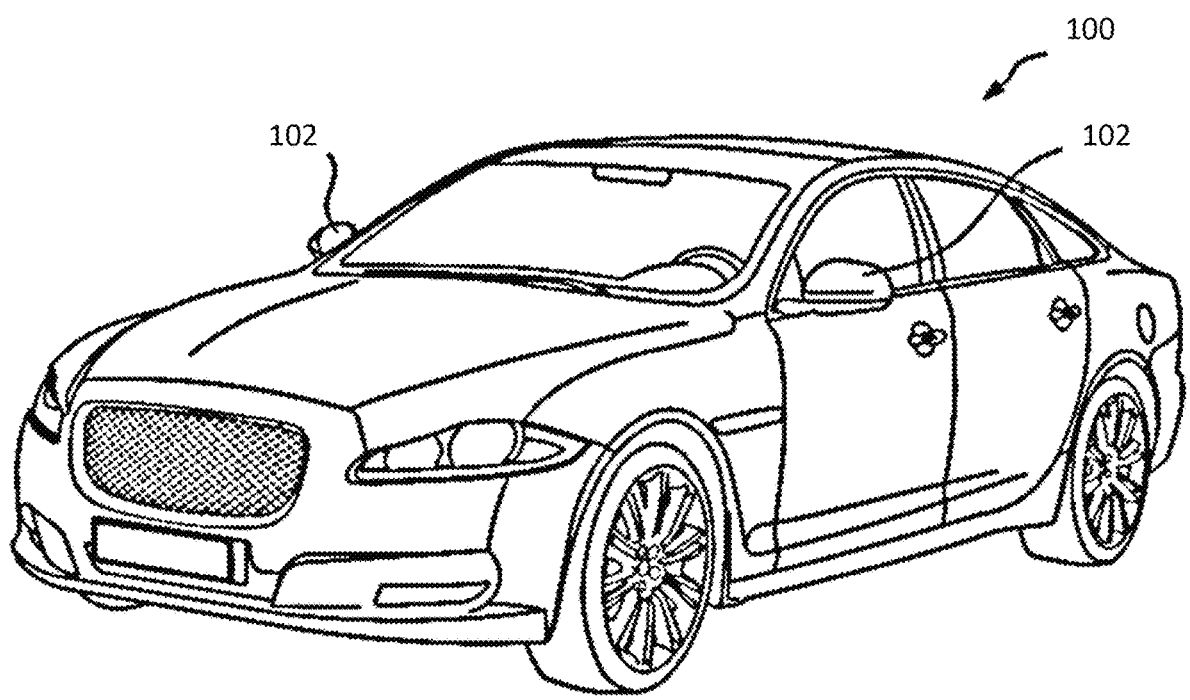
FIG. 1 illustrates a vehicle in accordance with aspects of the present disclosure.

The following description is merely exemplary in nature and is not intended to limit the present disclosure, application, or uses. It should be understood that throughout the drawings, corresponding reference numerals indicate like or corresponding parts and features.

FIG. 1 illustrates a vehicle 100 in accordance with aspects of the present disclosure.

As shown in FIG. 1, the vehicle 100 includes a rear view device 102 on each of its sides. Although the vehicle 100 is illustrated as a passenger car, the vehicle 100 may be any other type of vehicle, non-limiting examples of the vehicle 100 include a truck, off-road vehicle, bus, motorcycle, aircraft, tram, locomotive, or heavy-duty vehicle.

In FIG. 1, the rear view devices 102 are illustrated as side view mirrors. In alternative variations, the rear view devices 102 may be implemented as camera systems or combinations of side view mirrors and camera systems. The rear view devices 102 are arranged on the vehicle 100 such that they may be adjusted to provide a view rearward of the vehicle to a driver.

The operation of the rear view device 102 will now be further described with additional reference to FIGS. 2A-3C. While the following description will refer to the rear view device 102 of the left side of the vehicle, it will be appreciated that the rear view device 102 has an analogue structure.

Figure 2A:
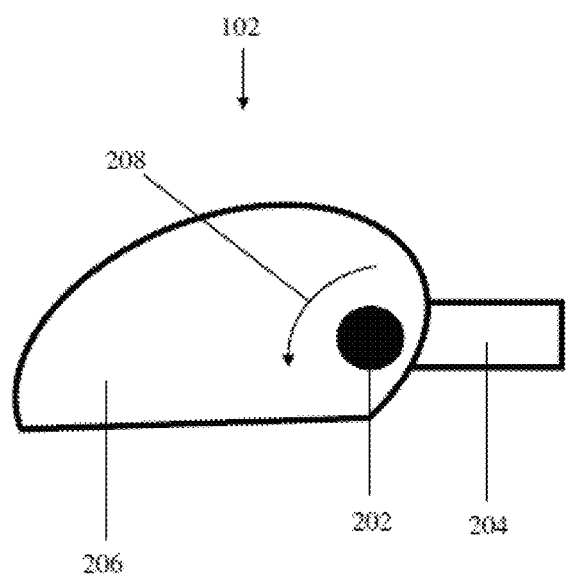
FIG. 2A illustrates a top down view of a rear view device with a mirror head in a drive position in accordance with aspects of the present disclosure.
Figure 2B:
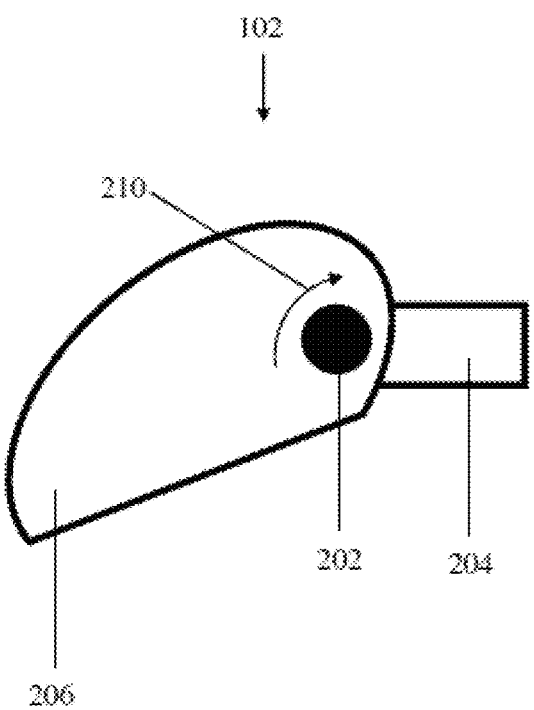
FIG. 2B illustrates a top down view of the rear view device with the mirror head in a folded position in accordance with aspects of the present disclosure.

FIGS. 2A-B show a top down view of the rear view device 102 in accordance with aspects of the present disclosure.

As shown in FIGS. 2A-B the rear view device 102 includes a first substantial vertical axis 202, a mirror base 204, and a mirror head 206. In FIG. 2A, the rear view device 102 can be seen in a top down view with the mirror head 206 in a drive position. When actuated in a first direction (first horizontal, anti-clockwise rotation towards the vehicle body, shown as arrow 208) relative to the first axis 202, movement is imparted to the mirror head 206 to rotate it around the first axis 202 to a stored position as shown in FIG. 2B. Additionally, when actuated in a second direction (second horizontal, clockwise rotation away from the vehicle body, shown as arrow 210) relative to the first axis 202, movement can be imparted to the mirror head 206 when in the stored position shown in FIG. 2B to rotate it back to the drive position shown in FIG. 2A.

The actuation of the mirror head 206 about the first axis 202 can be done from any position to move the mirror head 206 to any other position about the first axis 202. For example, the mirror head 206 may start in the stored position as shown in FIG. 2B and then be actuated in the second direction 210 about the first axis 202 to move the mirror head 206 to the drive position. The mirror head 206 may, but not necessarily, be adjusted to any position between the drive position shown in FIG. 2A and the stored position shown in FIG. 2B. The mirror head 206 may optionally even rotate to a third position (not shown) as a safety mechanism to absorb energy in an impact with a pedestrian.

Additionally, when the mirror head 206 is in the drive position as shown in FIG. 2A, actuation can be performed such that it moves the mirror head 206 (tilted upward or tilted downward) to adjust the rearward field of view of the driver of the vehicle 100. The movement required to adjust the mirror head 206 such that it adjusts the rearward field of view of the driver of the vehicle 100 is less than that required to move the mirror head 206 from the drive position to the stored position or from the stored position to the drive position.

Figure 3A:
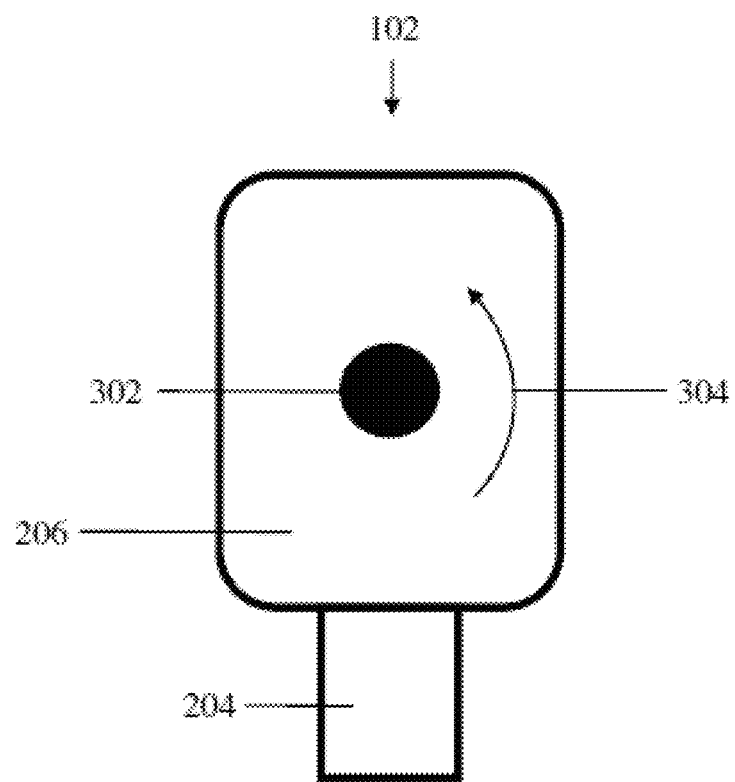
FIG. 3A illustrates a side view of the rear view device with the mirror head in a nominal position in accordance with aspects of the present disclosure.
Figure 3B:
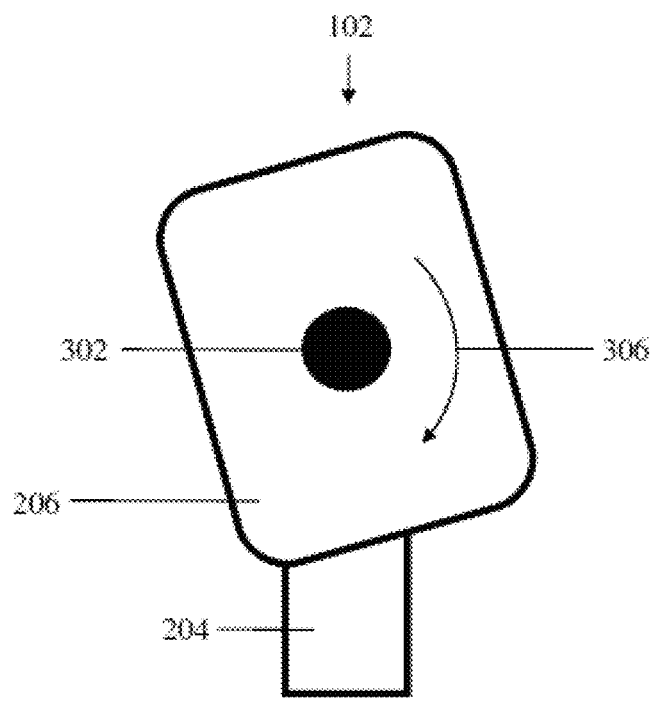
FIG. 3B illustrates a side view of the rear view device with the mirror head tilted upwards in accordance with aspects of the present disclosure.
Figure 3C:
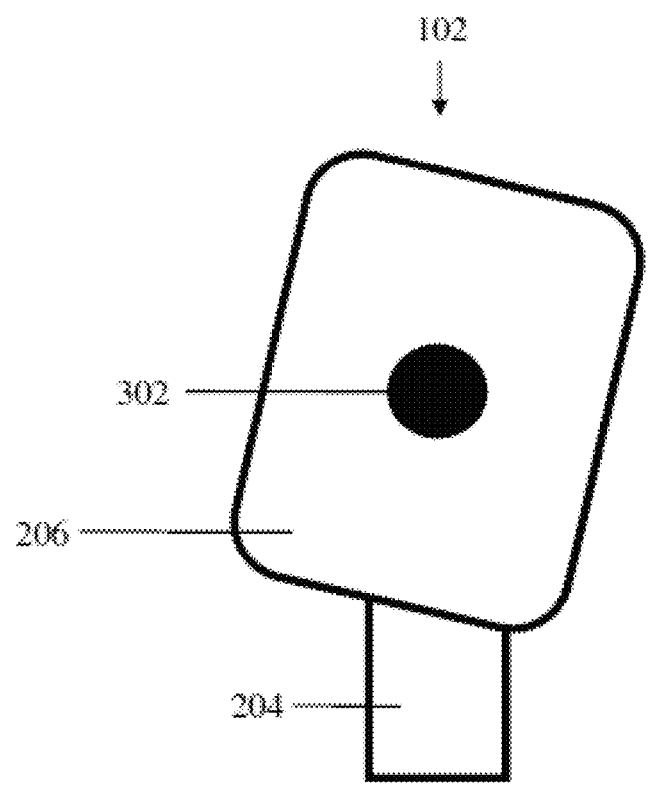
FIG. 3C illustrates a side view of the rear view device with the mirror head tilted downwards in accordance with aspects of the present disclosure.

FIGS. 3A-C show a side view of the rear view device 102 in accordance with aspects of the present disclosure. As shown in the FIGS. 3A-C, the rear view device 102 includes the mirror base 204, the mirror head 206, and a second substantial horizontal axis 302. In FIG. 3A, the rear view device 102 can be seen in a side view with the mirror head 206 in a nominal position, in particular in form of a default position. When actuated in a third direction as shown by an arrow 304 (anti-clockwise rotation), movement is imparted to the mirror head 206 such that it is tilted upwards to the position shown in FIG. 3B. When actuated in a fourth direction as shown by an arrow 306 (clockwise rotation), movement is imparted to the mirror head 206 such that it is tilted downward to the position shown in FIG. 3C.

The actuation of the mirror head 206 about the second axis 302 can be done from any position to move the mirror head 206 to any other position about the second axis 302. For example, the mirror head may be actuated in the third direction 304 to tilt the mirror head 206 upwards as shown in FIG. 3B and then actuated in the fourth direction 306 to tilt the mirror head 206 downwards as shown in FIG. 3C. While being tilted downwards, actuation can be stopped to adjust the mirror head 206 to the nominal position shown in FIG. 3A or continued to adjust the mirror head 206 downwards until it reaches the position shown in FIG. 3C. Further, the mirror head 206 can be tilted to any position between that shown in FIG. 3B and FIG. 3C.

The description and the discussion of the figures that follows is in regards to the rear view device 102 of the left side of the vehicle, however it should be noted that the rear view device 102 of the right side of the vehicle functions in a similar fashion.

Figure 4:
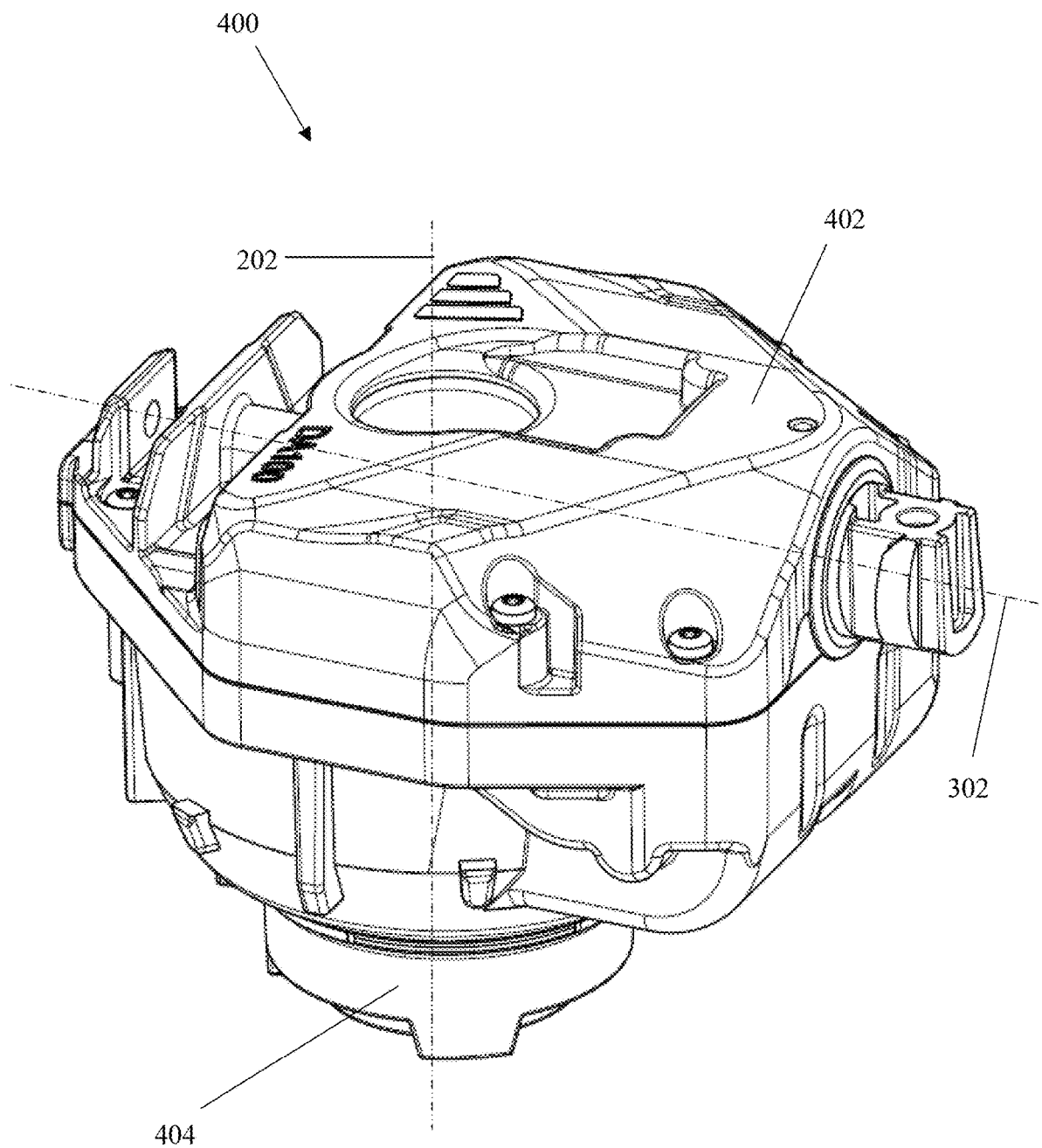
FIG. 4 illustrates an actuator in accordance with aspects of the present disclosure.

FIG. 4 shows an actuator 400 in accordance with aspects of the present disclosure. As shown in the figure, the actuator 400 includes the first vertical axis 202 and the second horizontal axis 302. The first axis 202 is substantially perpendicular to the second axis 302. Further, the first axis 202 is substantially vertical relative to the actuator 400 and the second axis 302 is substantially horizontal relative to the actuator 400. The actuator 400 includes a housing 402 and a shaft 404. The housing 402 of the actuator 400 encloses a gear assembly (shown in FIG. 5). The actuator 400 is configured to rotate in the first direction 208 and the second direction 210 about the first axis 202 to rotate the mirror head 206 in example horizontal folding directions shown in FIGS. 2A-2B. The actuator 400 is also configured to rotate in the third direction 304 and the fourth direction 306 about the second axis 302 to rotate the mirror head 206 in for example the tilting upward direction 304 and downward direction 306 shown in FIGS. 3A-3B The housing 402 of the actuator 400 is configured to rotate and the shaft 404 of the actuator 400 is configured to remain stationary. The shaft 404 of the actuator is configured to be fixed on the mirror base 204 (shown in FIGS. 2A-2B and FIGS. 3A-3C).

Figure 5:
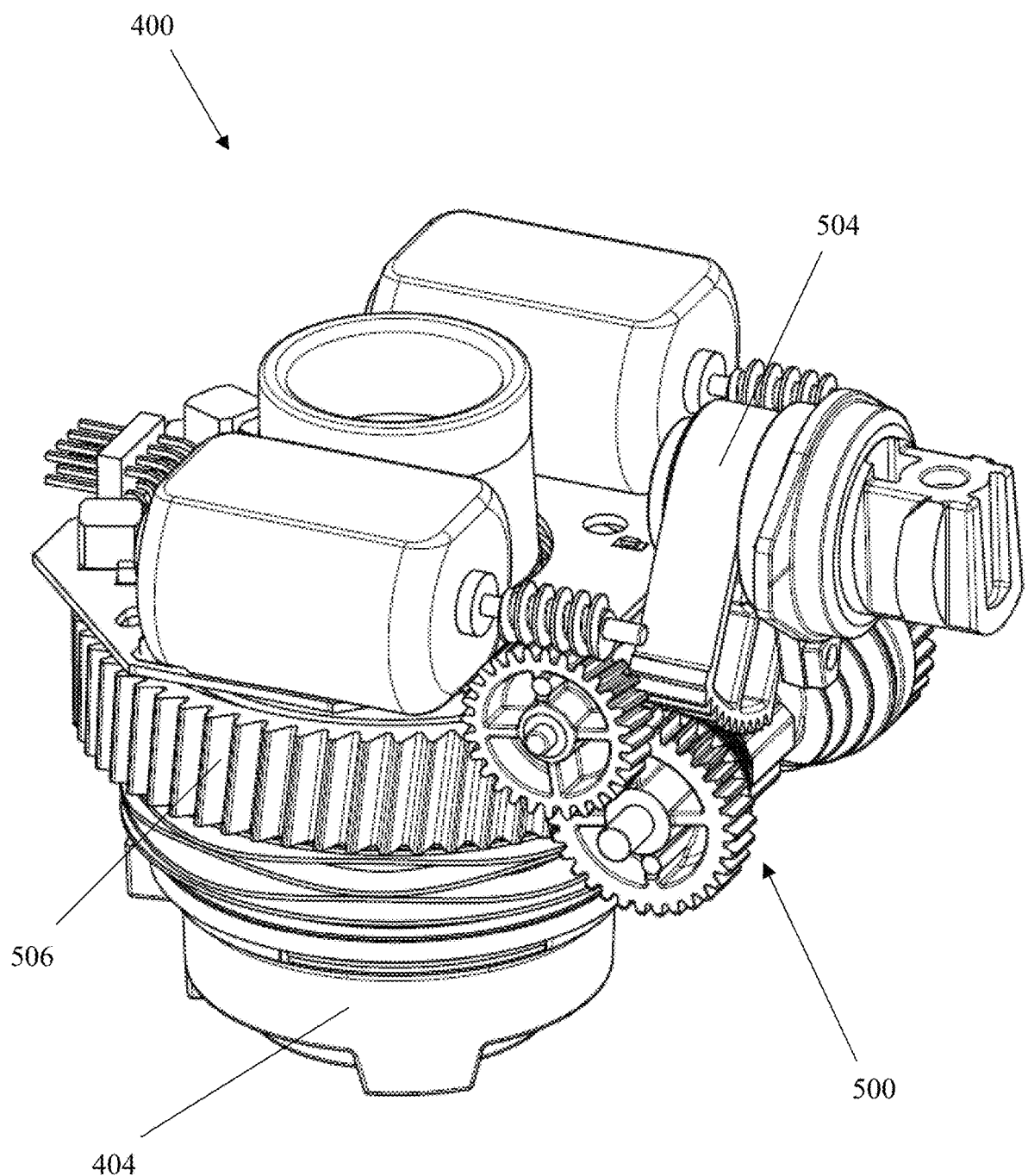
FIG. 5 illustrates the actuator with its housing removed in accordance with aspects of the present disclosure.

FIG. 5 illustrates the actuator 400 with the housing 402 of FIG. 4 removed in accordance with aspects of the present disclosure. As shown in the figure, the actuator 400 includes a gear assembly 500, a tilt drive 504, and a fold drive 506. The tilt drive 504 is configured to rotate the housing 402 of the actuator 400 which in turn rotates the mirror head 206 about the second axis 302, and the fold drive 506 is configured to rotate the housing 402 of the actuator 400 which in turn rotate the mirror head 206 around the first axis 202. The operation and arrangement of gear assembly 500, the tilt drive 504, and the fold drive 506 will now be described.

Figure 6:
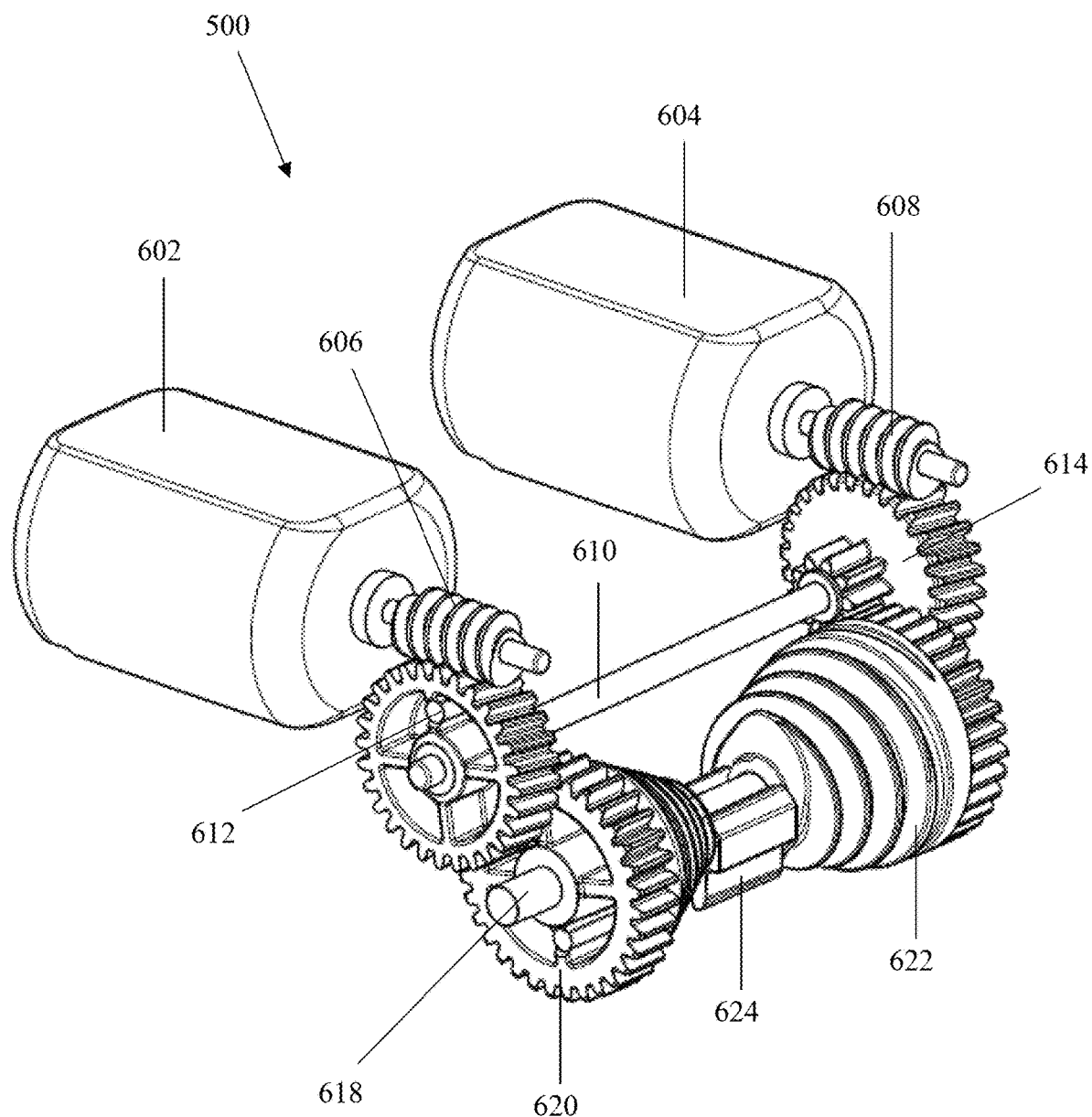
FIG. 6 illustrates a perspective view of a gear assembly in accordance with aspects of the present disclosure.

FIG. 6 illustrates a perspective view of the gear assembly 500 in accordance with aspects of the present disclosure.

As shown in FIG. 6, the gear assembly 500 includes a tilt motor 602, a fold motor 604, a tilt worm gear 606, a fold worm gear 608, an intermediate spindle 610, an intermediate tilt gear 612, an intermediate fold gear 614, a tilt gear 620, a fold gear 622, a spindle 618 (shown in FIG. 7) and a slide 624. The tilt motor 602 is configured to rotate the tilt worm gear 606. The tilt worm gear 606 is configured to rotate the intermediate tilt gear 612, which is configured to rotate the tilt gear 620. Similarly, the fold motor 604 is configured to rotate the fold worm gear 608. The fold worm gear 608 is configured to rotate the intermediate fold gear 614, which is configured to rotate the fold gear 622. The intermediate tilt gear 612 and the intermediate fold gear 614 are configured to rotate independently around the intermediate spindle 610. Similarly, the tilt gear 620 and the fold gear 622 are configured to rotate independently around the spindle 618. The tilt gear 620 is configured to rotate the tilt drive 504 (shown in FIG. 5) about the second axis 302 (shown in FIG. 4), and the fold drive 622 is configured to rotate the fold drive 506 (shown in FIG. 5) about the first axis 202 (shown in FIG. 4).

Figure 7:
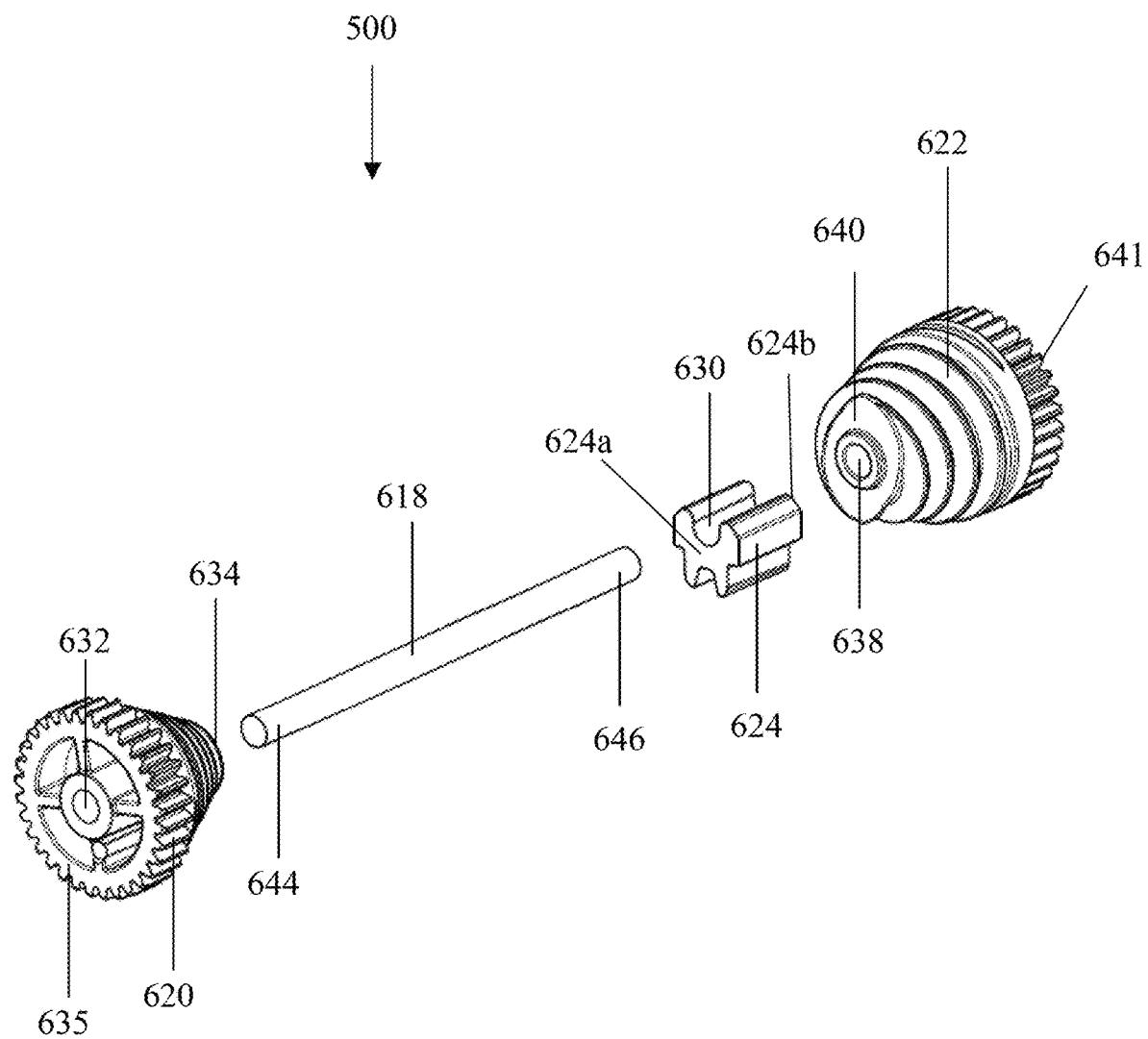
FIG. 7 illustrates an exploded view of a part of the gear assembly in accordance with aspects of the present disclosure.
Figure 8:
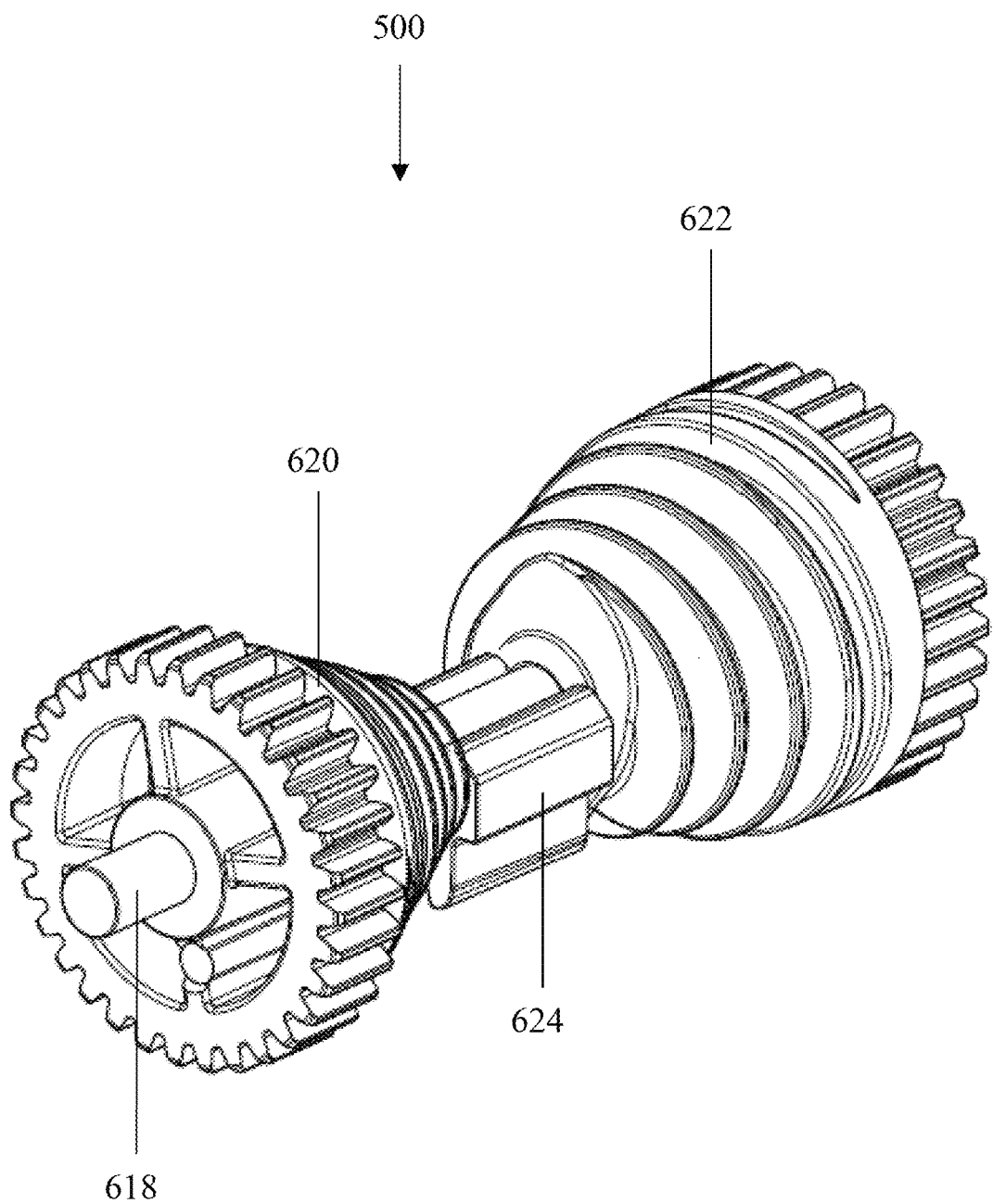
FIG. 8 illustrates an assembled view of the part of the gear assembly in accordance with aspects of the present disclosure.

FIG. 7 illustrates an exploded view of a part of the gear assembly 500, and FIG. 8 illustrates said part of the gear assembly 500 assembled in accordance with aspects of the present disclosure. As shown in the figures, the gear assembly 500 includes the spindle 618, the tilt gear 620, the fold gear 622, and the slide 624. The tilt gear 620 includes a through hole 632, and the fold gear 622 includes a through hole 638. It is understood that a bore (not shown) may be defined in each of the tilt gear 620 and fold gear 622 in lieu of the through holes 632, 638. The spindle 618 may be a cylindrical rod having a first end 644 and a second end 646. The through hole 632 of the tilt gear 620 is configured to receive the first end 644 of the spindle 618; and the through hole 638 of the fold gear 622 is configured to receive the second end 646 of the spindle 618. The slide 624 has a channel 630 (or may be an aperture, not shown) which is contoured to match with the shape and size of the spindle 618 so that the slide 624 may be slidably attached to the spindle 618. The slide 624 has a tilt end 624a and a fold end 624b. The tilt end 624a of the slide 624 is configured to abut an inner face 634 of the tilt gear 620 thereby fixing an axial position of the tilt gear 620 along the length of the spindle 618 to maintain meshing between the tilt gear 620 and the tilt drive 504. The fold end 624b of the slide 624 is configured to abut an inner face 640 of the fold gear 622 thereby fixing an axial position of the fold gear 622 along the length of the spindle 618 to maintain meshing between the fold gear 622 and the fold drive 506. An outer face 635 of the tilt gear 620 may, but not necessarily, abut a first lateral member 410 within the housing 402 or provided by the housing 402 (shown in FIG. 10), and an outer face 641 of the fold gear 622 may, but not necessarily, abut a second lateral member 412 within the housing 402 or provided by the housing 402 (shown in FIG. 10). The first lateral member 410 and the second lateral member 412 may include, but not limited to, lateral spacers (not shown). In one aspect, the outer face 635 of the tilt gear 620 may abut a first inner wall of the housing 402, and the outer face 641 of the fold gear 622 may abut a second inner wall of the housing 402.

To assemble the gear assembly 500, the first end 644 of the spindle 618 is inserted into the through hole 632 of the tilt gear 620. Next, the slide 624 is inserted onto second end 646 of the spindle 618 via the channel 630. Once attached, the slide 624 is moved along spindle 618 from the second end 646 towards the first end 644 until the tilt end 624a of the slide 624 abuts against the inner face 634 of the tilt gear 620. After the slide 624 has been attached. The fold gear 622 is attached to the spindle 618 by inserting the second end 646 of the spindle 618 into the through hole 638 of the fold gear 622 such that the inner face 640 of the fold gear 622 abuts the fold end 624b of the slide 624. The assembled part of the gear assembly 500 is shown in FIG. 8.

Figure 9:
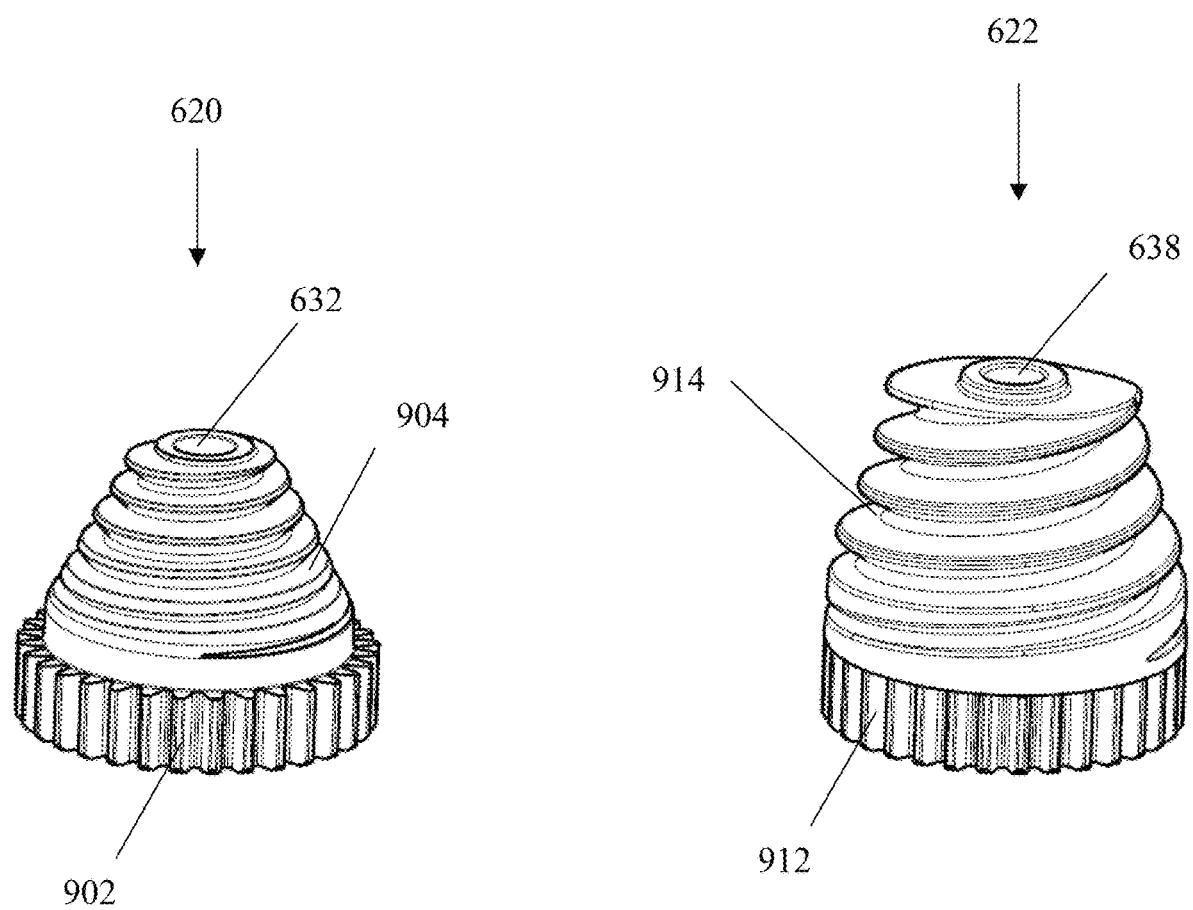
FIG. 9 illustrates a tilt gear and a fold gear in accordance with aspects of the present disclosure.

FIG. 9 illustrates the tilt gear 620 and the fold gear 622 in accordance with aspects of the present disclosure. As shown in the figure, the tilt gear 620 includes a spur gear portion 902 and a worm gear portion 904. The fold gear 622 includes a spur gear portion 912 and a worm gear portion 914. The tilt gear 620 and the fold gear 622 may, but not necessarily, be formed as a single monolithic structure comprising two different gear portions. In this example variation, the tilt gear 620 and the fold gear 622 are formed from spur gear portions 902, 912 and worm gear portions 904, 914. In other example variations, the tilt gear 620 and the fold gear 622 may be formed from a combination of any number of different types of gears. The formation of each of the tilt gear 620 and the fold gear 622 as a single, monolithic components, wherein each includes a spur gear portion (902, 912) and a worm gear portion (904, 914) helps to prevent backlash within the tilt gear 620, the fold gear 622, the tilt drive 504, and the fold drive 506 of FIG. 5.

The tilt gear 620 and the fold gear 622 each has a through hole 632 and 638, respectively, that is configured to only accommodate the spindle end 644 and 646, respectively, only without any additional cavity space or hole for any additional member such as a biasing member or a worm insert to be inserted into the through hole (or bore) of tilt gear and/or the fold gear. This configuration not only makes the gear design simple and more robust (minimizing backlash), but also makes the assembly of the gears simple and cost effective. Further, the through holes of the fold gear 622 and the tilt gear 620 may be produced using a simple tool. Thus, the cost of producing the fold gear 622 and/or the tilt gear 620 may be low.

Figure 10:
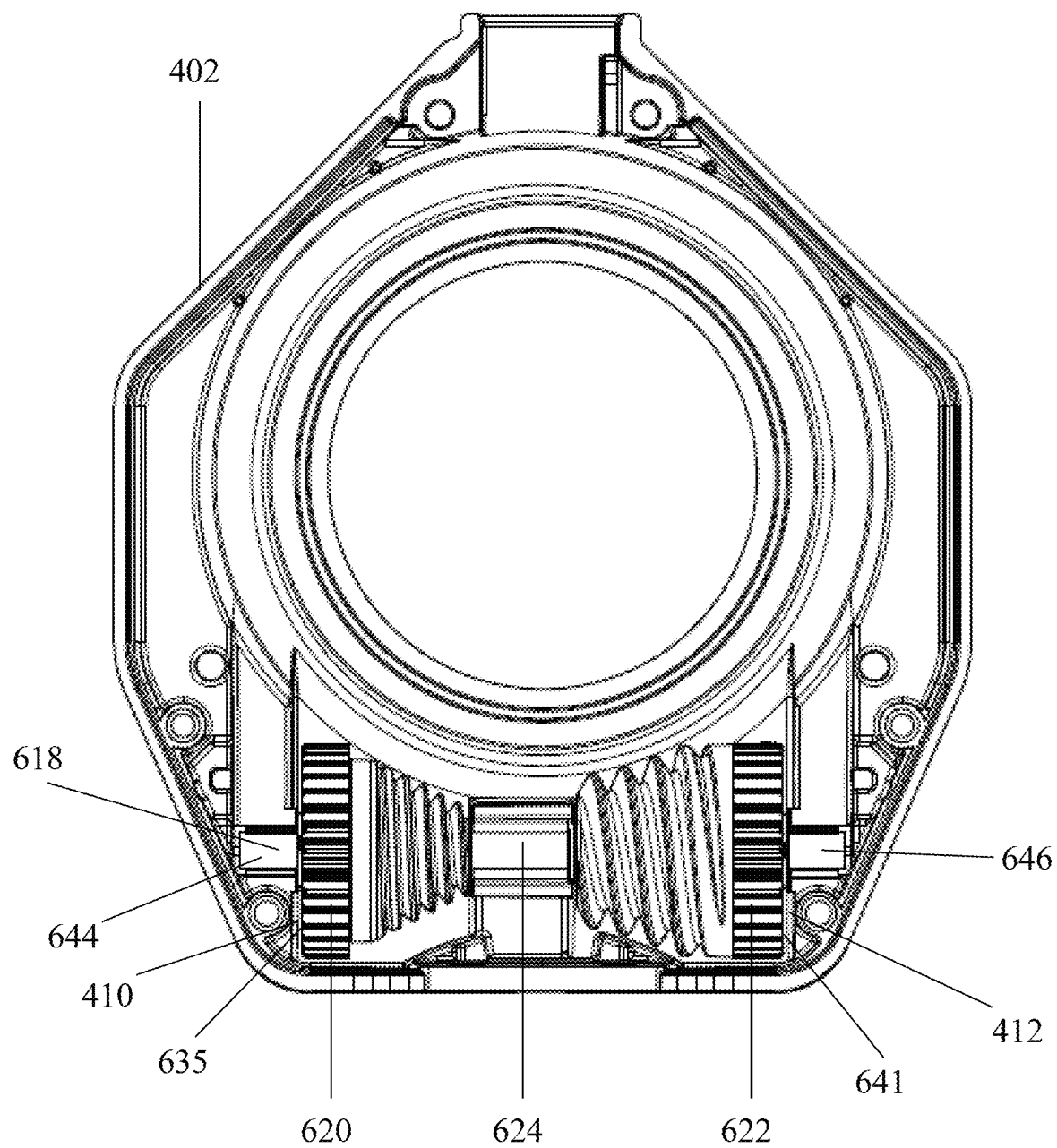
FIG. 10 illustrates an assembled top view of the gear assembly within the housing in accordance with aspects of the present disclosure.

FIG. 10 illustrates a top view of the gear assembly 500 installed within the housing 402 of the actuator 400 in accordance with aspects of the present disclosure. As shown in the figure, the tilt gear 620, the slide 624 and the fold gear 622 are axially fitted along the length of the spindle 618 such that there is no gap or space in between the tilt gear 620, the slide 624 and the fold gear 622. This configuration prevents axial displacement between the tilt gear 620, the slide 624 and the fold gear 622 such that the tilt gear 620 is always meshing with the tilt drive 504, and the fold gear 622 is always meshing with the fold drive 506.

Figure 11:
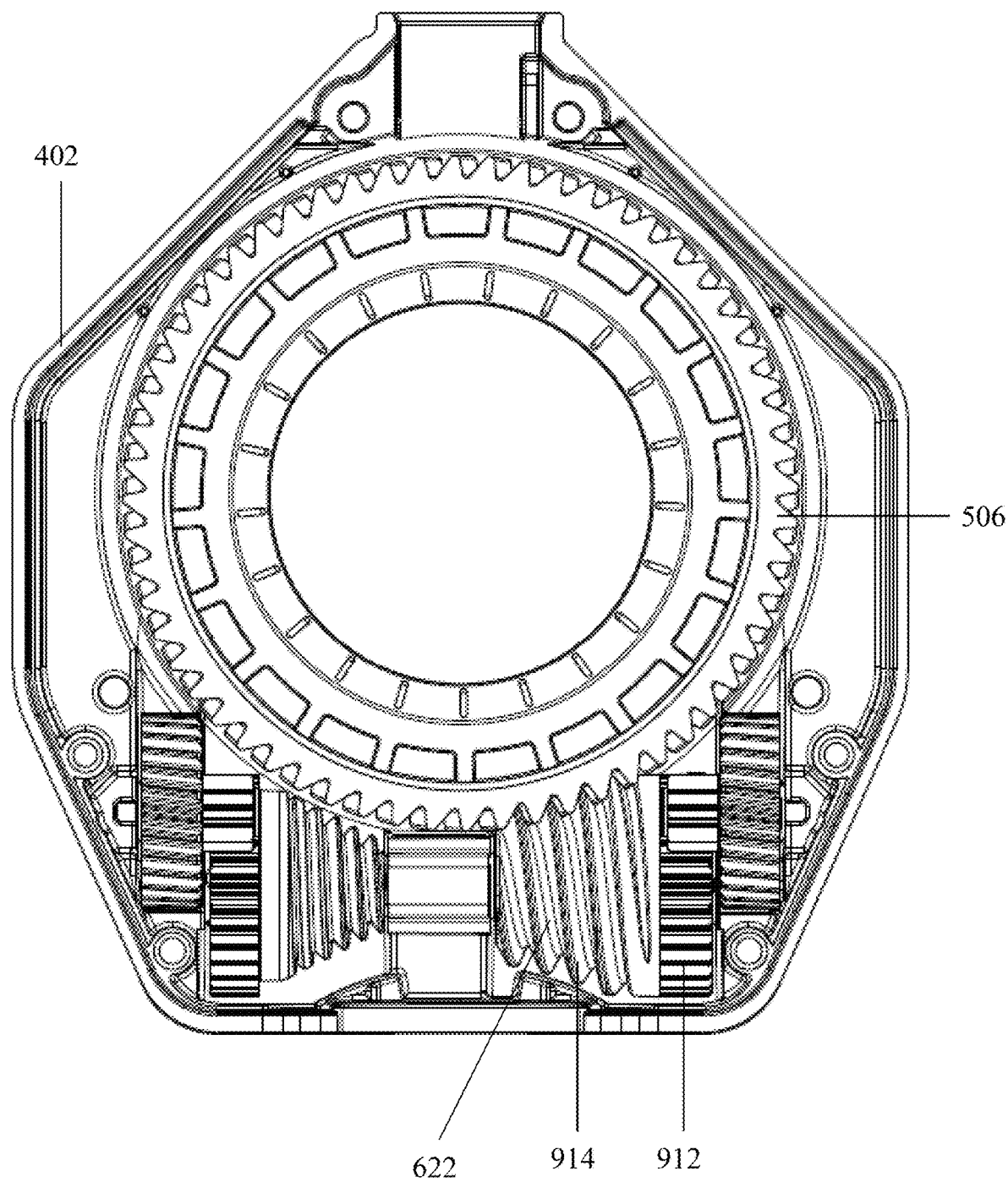
FIG. 11 illustrates a relative position between a fold drive and the gear assembly in accordance with aspects of the present disclosure.

FIG. 11 is a top view of the gear assembly 500 installed within the housing 402 illustrating meshing between the fold gear 622 and the fold drive 506. As shown in the figure, the worm gear portion 914 of the fold gear 622 is configured to mesh with the fold drive 506 such the rotation of the fold gear 622 leads to the rotation the fold drive 506 which in turn leads to the rotation of the housing 402 of the actuator 400 about the first axis 202 shown in FIG. 4.

Figure 12:
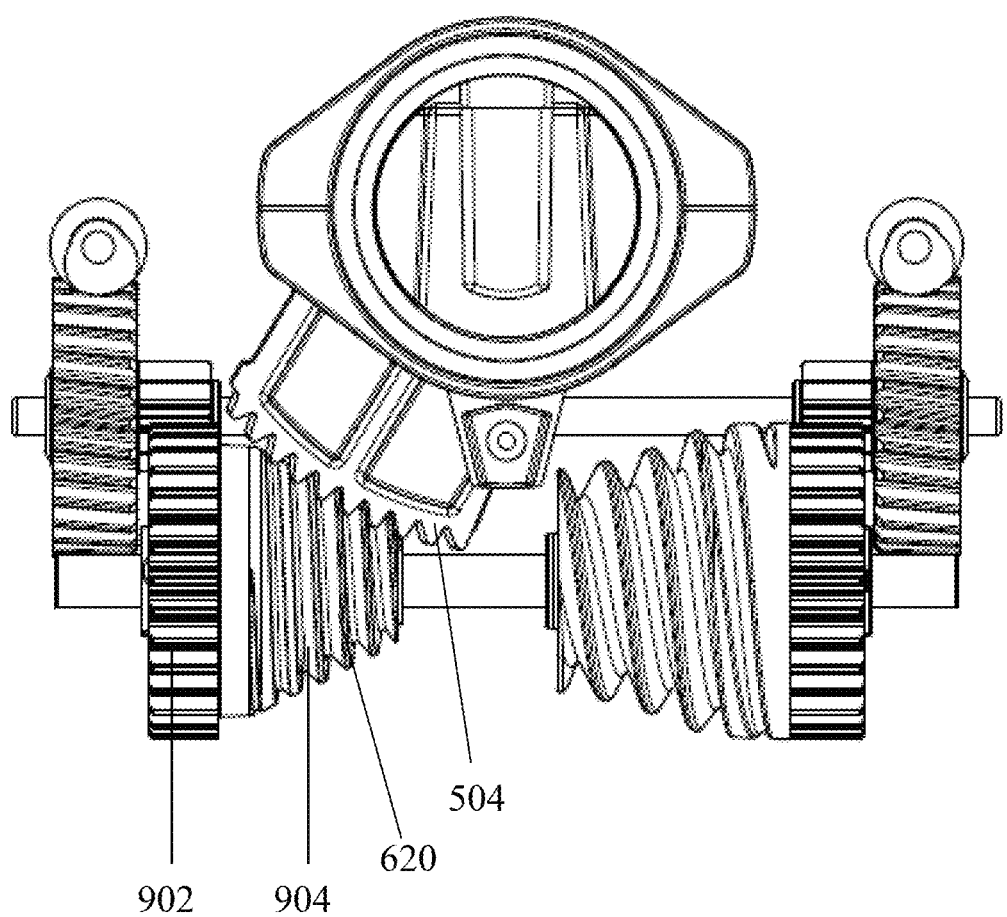
FIG. 12 illustrates a relative position between a tilt drive and the gear assembly in accordance with aspects of the present disclosure.

FIG. 12 is a front view of the gear assembly 500 illustrating meshing between the tilt gear 620 and the tilt drive 504. As shown in the figure, the worm gear portion 904 of the tilt gear 620 is configured to mesh with the tilt drive 504 such the rotation of the tilt gear 620 leads to the rotation the tilt drive 504 which in turn leads to the rotation of the housing 402 of the actuator 400 about the second axis 302 shown in FIG. 4.

Figure 13:
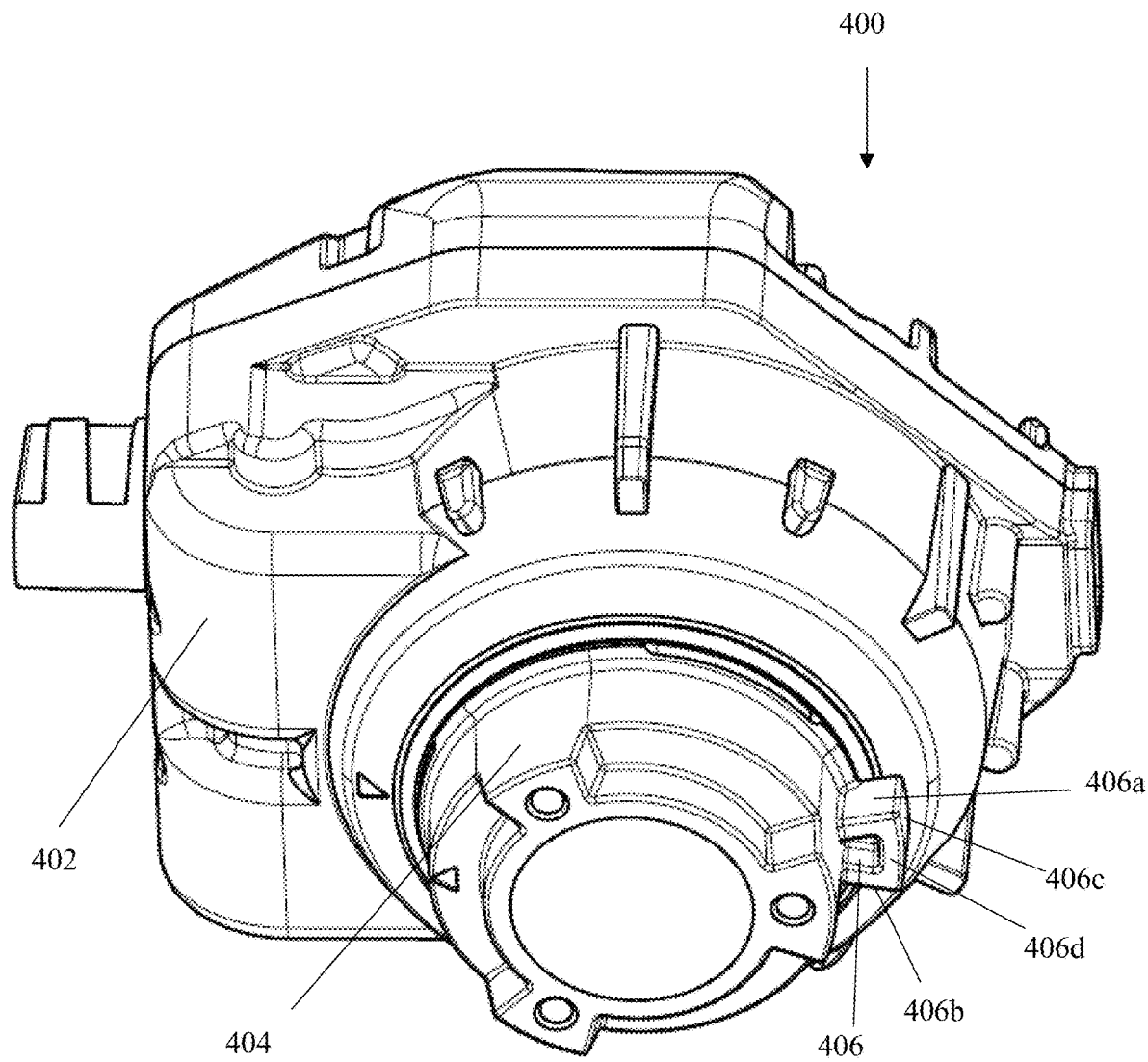
FIG. 13 is an isometric view of an actuator in accordance with aspects of the present disclosure.

FIG. 13 illustrates a bottom isometric view of the actuator 400 in accordance with aspects of the present disclosure. As shown in the figure, the actuator 400 includes the housing 402, which is the rotating component of the actuator 400 and the shaft 404, which is the fixed component of the actuator 400. The shaft 404 is configured to be fixed on the mirror base shown in FIGS. 2A-2B and 3A-3C. The shaft 404 includes an end stop 406 configured on the side wall of the shaft 404. The end stop 406 has a first side wall 406a, a second side wall 406b opposite to the first side wall 406a, a third side wall 406c and a bottom wall 406d. In the illustrated embodiment, the first side wall 406a, the second side wall 406b and the bottom wall 406d have flat surfaces and the third side wall 406c has a curved surface. The end stop 406 is configured to remain stationary with the shaft 404 of the actuator 400. Thus, the housing 402 of the actuator 400 rotates in two directions relative to the end stop 406 of the actuator 400. The end stop 406 is configured to restrict the rotation of the actuator 400 by limiting the horizontal rotational movement of the housing 402 in the first direction 208 and the second direction 210 about the first axis 202 (shown in FIGS. 2A-2B) when the end stop 406 abuts a first wall 706a of a shroud 700 connected to the housing 402 and when the end stop 406 abuts a second wall 706b of the shroud 700 (shown in FIGS. 16A-16B and FIGS. 17A-17B).

Figure 14:
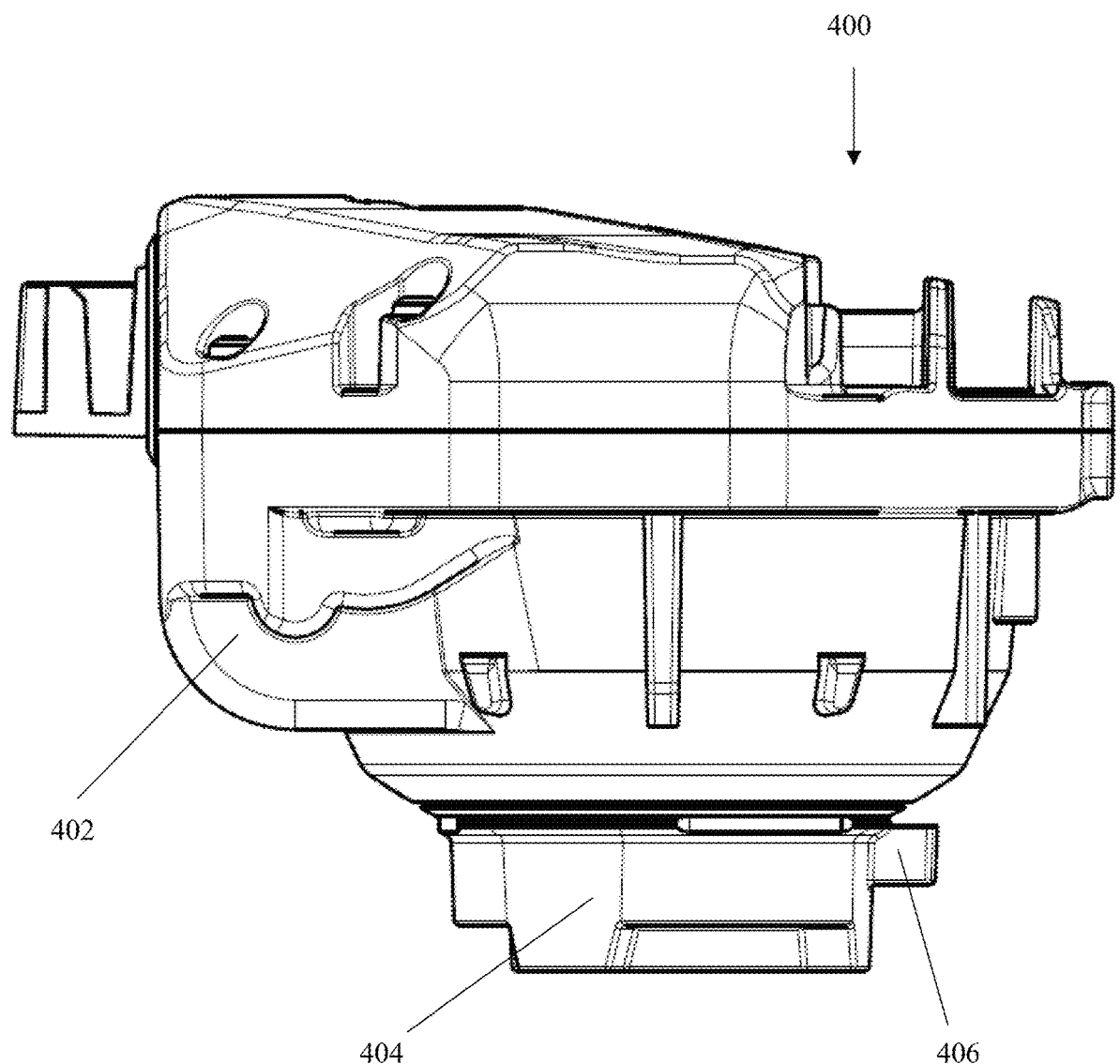
FIG. 14 illustrates a side view of the actuator in accordance with aspects of the present disclosure.
Figure 15A:
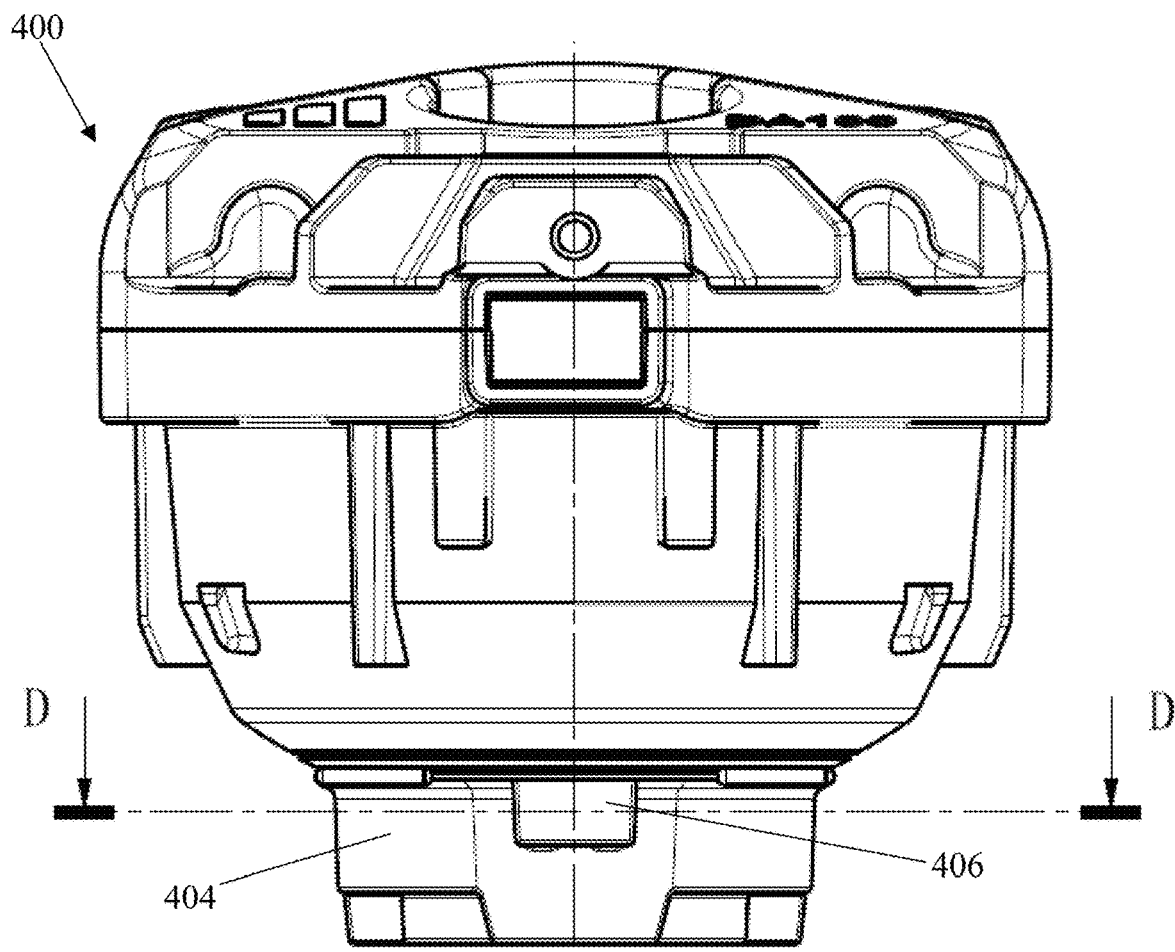
FIG. 15A is a front view of the actuator in accordance with aspects of the present disclosure.

FIG. 14 and FIG. 15A illustrate side views of the actuator 400 showing the position of the end stop 406 on the shaft 404 of the actuator 400.

Figure 15B:
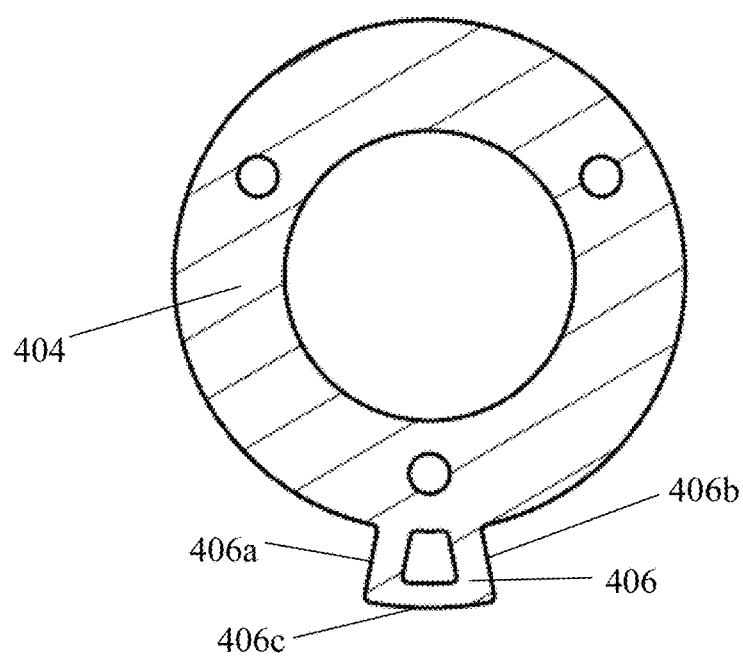
FIG. 15B is a sectional view of FIG. 15A.

FIG. 15B illustrates a sectional view along a section line D-D in FIG. 15A. As shown in the figure, the end stop 406 is disposed on the side wall of the shaft 404 such that the end stop 406 radially extends from the shaft 404. The end stop 406 is configured to interact with the shroud 700 connected the housing 402 wherein the end stop 406 is configured to be disposed in a slot 706 of the shroud 700 (shown in FIGS. 16A-16B and 17B) in order to limit the rotational movement of the housing 402. It is understood that the shroud 700 rotates together with the housing 402 about the first axis 202. The end stop 406 may itself be specifically configured to contact the shroud 700 in a manner that limits the rotation of the housing 402 in a consistent, repeatable manner, while avoiding degradation or damage to either the end stop 406 or the shroud 700.

Figure 16A:
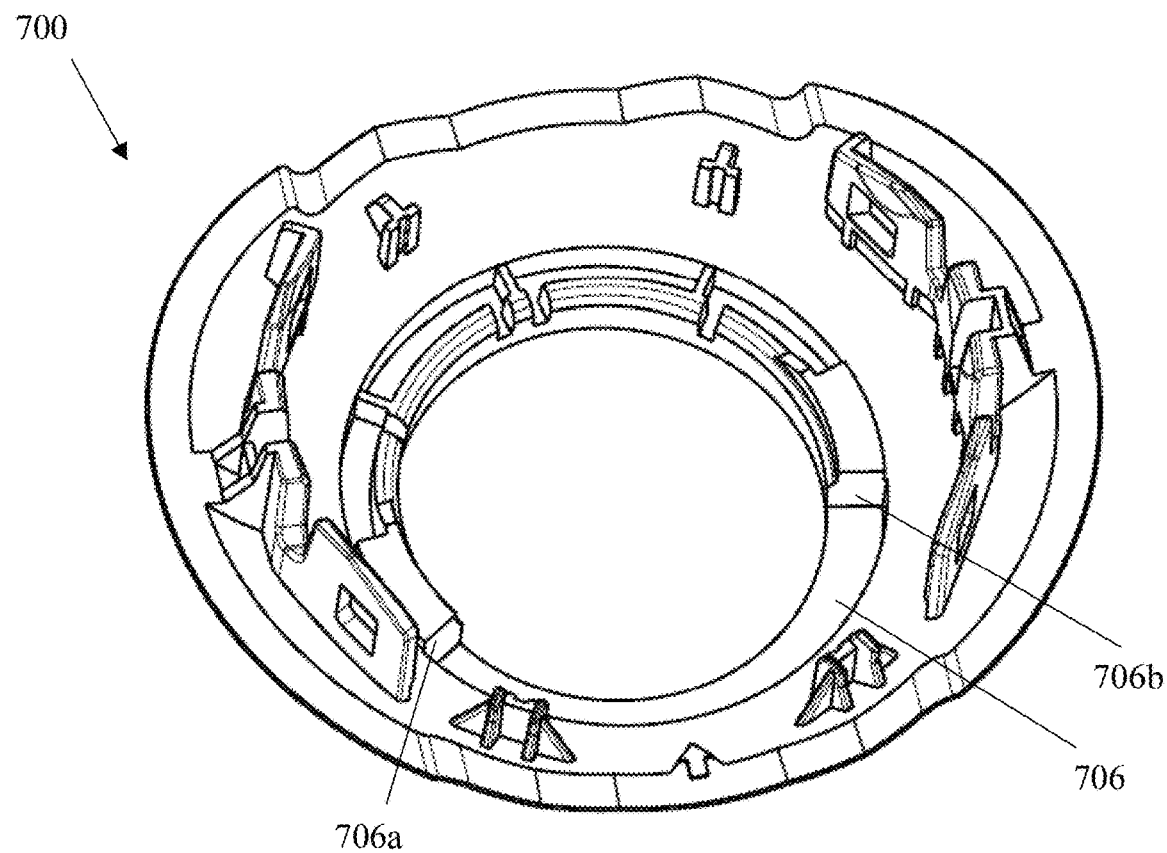
FIG. 16A illustrates an isometric view of a shroud in accordance with aspects of the present disclosure.
Figure 16B:
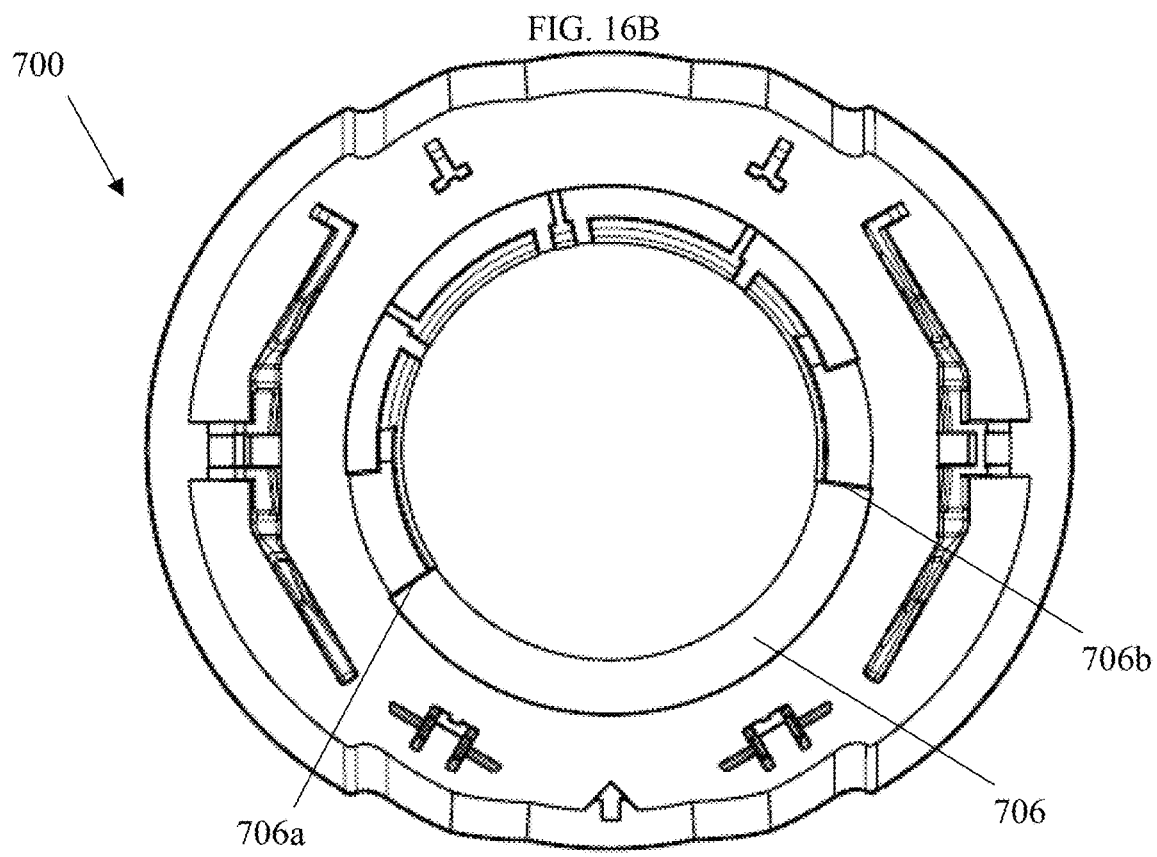
FIG. 16B illustrates a top view of the shroud in accordance with aspects of the present disclosure.

FIG. 16A and FIG. 16B illustrate an isometric view and a front view of the shroud 700. As indicated, the shroud 700 is configured to be attached to the housing 402 of the actuator 400 and thus the shroud 700 is configured to rotate with the housing 402 of the actuator 400. In order to restrict the rotation of the housing 402, the shroud 700 is provided with the slot 706 into which the end stop 406 of the actuator 400 is disposed. The slot 706 has the first wall 706a and the second wall 706b. The first wall 706a and the second wall 706b function to block the rotation of the shroud 700 (or define the maximum rotation of the shroud 700/housing 402 in the first and second directions) when first wall 706a of the shroud 700 contacts the first side wall 406a of the end stop 406 and when the second wall 706b of the shroud 700 contacts the second side wall 406b of the end stop 406. Although solid walls are depicted, blocking posts or alternative constructions capable of isolating the relative movement of the end stop 406 may be used.

The slot 706 may be sized and shaped to allow passage of the end stop 406 along its length. For instance the slot may extend in an arc along a portion of the shroud 700. The length of the arc may be determined based on the desired rotational capabilities of the mirror head 206. For example, if a 180 degree rotational capabilities of the mirror head 206 is desired, the slot 706 may have a central angle of 180 degrees.

Figure 17A:
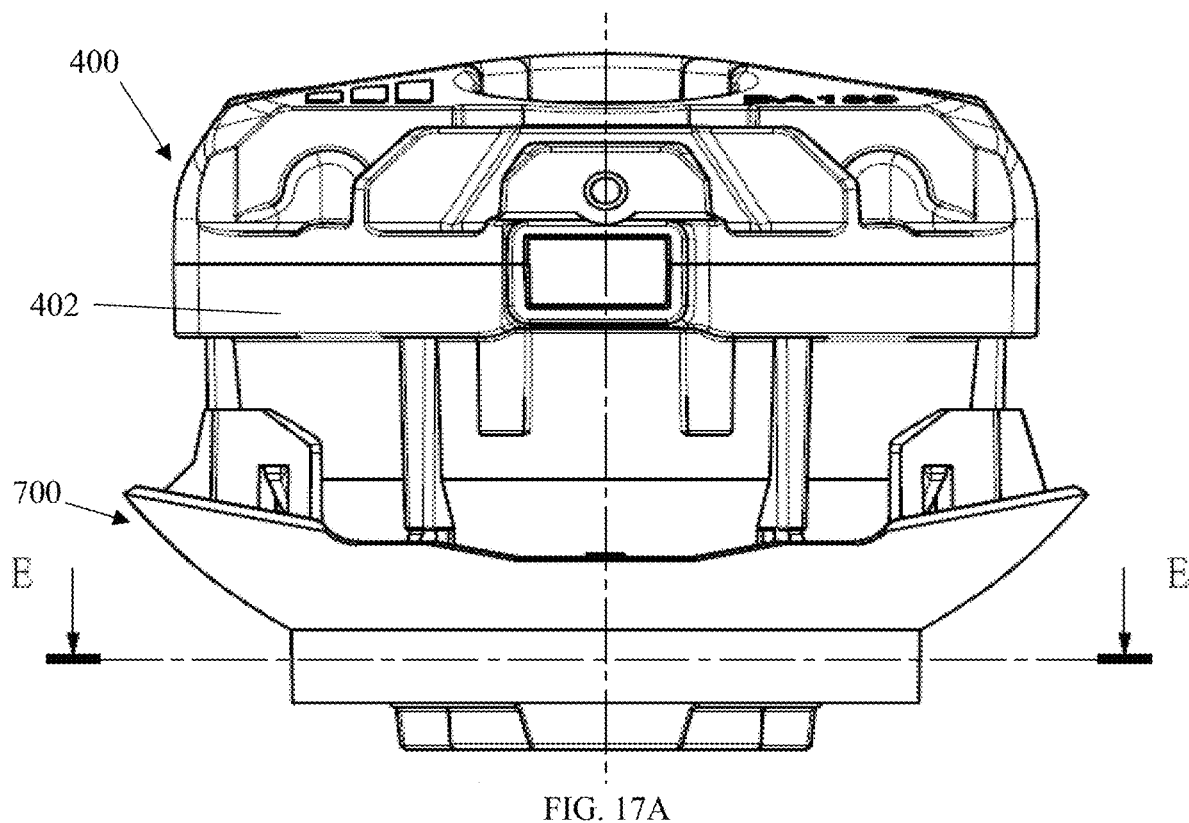
FIG. 17A is a front view of an actuator and a shroud in accordance with aspects of the present disclosure.

FIG. 17A illustrates the actuator 400 with the shroud 700 in an assembled state. The shroud 700 is attached to the housing 402 of the actuator 400 via one or more attachment components (not shown).

Figure 17B:
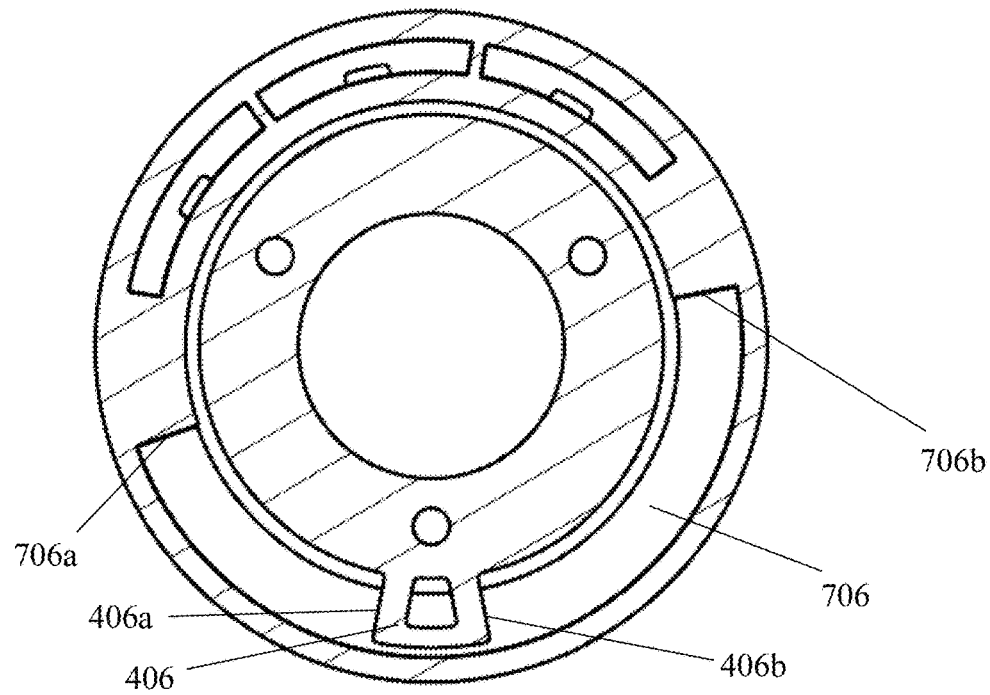
FIG. 17B illustrates is a sectional view of FIG. 17A.

FIG. 17B illustrates a sectional view along a section line E-E in FIG. 17A. As shown in the figure, the end stop 406 is disposed in the slot 706 of the shroud 700. The shroud 700 is configured to rotate with the housing 402 and the rotation of the shroud is restricted by the first wall 706a and the second wall 706b by contacting the first side wall 406a and the second side wall 406b of the end stop 406.

The rear view device described herein may comprise desired elements not shown in the figures. Desired elements may include a camera module, an indicator module, a light module, a blind side detection module, a blind side indicator, a multi-functional light module, an external light module, an internal light module, a front light, a back light, a fog light, a brake light, an acceleration light, a turn signal, a logo lamp, a front area illumination light, a ground illumination light, a puddle light, a flash light, a navigation light, a position light, an emergency light, a spotlight, a green light, a red light, a warning light, a turn signal light module, an approach light, a search light, an information light, a display, an antenna and/or any combination thereof. Some of the desired elements may also be integrated such that they may operate behind or through a coating such as a partially transparent chromium base coating. Some of the desired elements may provide an indication signal to a driver of a vehicle equipped with one of the rear view device 102.

Conventional rear view devices provide actuation of components along multiple axes. In order to enable actuation along multiple axes, a second actuator may be used which adds engineering and assembly complexity as well as cost to the assembly.

The foregoing description of various variations have been presented for purposes of illustration and description. It is not intended to be exhaustive or to limit the disclosure to the precise forms disclosed, and obviously many modifications and variations are possible in light of the above teaching. The example variations, as described above, were chosen and described in order to best explain the principles of the disclosure and its practical application to thereby enable others skilled in the art to best utilize the disclosure in various variations and with various modifications as are suited to the particular use contemplated.

REFERENCE SIGN LIST

100 Vehicle
102 Rear View Device
202 First Axis
204 Mirror Base
206 Mirror Head
208 First Direction
210 Second Direction
302 Second Axis
304 Third Direction
306 Fourth Direction
400 Actuator
402 Housing
404 Shaft
406 Endstop
406a First Side Wall
406b Second Side Wall
406c Third Side Wall
406d Bottom Wall
410 First Lateral Member
412 Second Lateral Member
500 Gear Assembly
504 Tilt Drive
506 Fold Drive
602 Tilt Motor
604 Fold Motor
606 Tilt Worm Gear
608 Fold Worm Gear
610 Intermediate Spindle
612 Intermediate Tilt Gear
614 Intermediate Fold Gear
618 Spindle
620 Tilt Gear
622 Fold Gear
624 Slide
624a Tilt End
624b Fold End
630 Channel
632 Through Hole of Tilt Gear
634 Inner Face of Tilt Gear
635 Outer Face of Tilt Gear
638 Through Hole of Fold Gear
640 Inner Face of Fold Gear
641 Outer Face of Fold Gear
644 First End of Spindle
646 Second End of Spindle
700 Shroud
706 Slot of Shroud
706a First Wall of Shroud 706b Second Wall of Shroud
902 Spur Gear Portion of Tilt Gear
904 Worm Gear Portion of Tilt Gear
912 Spur Gear Portion of Fold Gear
914 Worm Gear Portion of Fold Gear It is claimed:

1. An actuator for rotating a mirror head of a rear view device of a motor vehicle about two axes relative to a base of the rear view device, the actuator comprising:
    a gear assembly, comprising:
        a fold gear configured to rotate the mirror head in a first direction and a second direction about a first axis, wherein the fold gear comprises a first opening in form of a first bore or a first through hole,
        a tilt gear configured to rotate the mirror head in a third direction and a fourth direction about a second axis, wherein the tilt gear comprises a second opening in form of a second bore or a second thorough hole,
        a spindle having a first end and a second end, and
        a slide attached to the spindle via a channel,
    wherein the second opening of the tilt gear receives the first end of the spindle and the first opening of the fold gear receives the second end of the spindle;
    a housing enclosing the gear assembly, wherein the housing is configured to rotate with the mirror head in the first direction, the second direction, the third direction, and the fourth direction; and
    a shaft configured to be fixed on the base and configured to remain stationary, wherein the shaft provides at least one end stop configured to define a maximum rotation of the mirror head in the first direction and in the second direction.

2. The actuator according to claim 1, wherein
    the slide includes a tilt end and a fold end;
    the tilt end is configured to abut the tilt gear thereby fixing an axial position of the tilt gear along a length of the spindle to maintain a meshing between the tilt gear and a tilt drive; and
    the fold end is configured to abut the fold gear thereby fixing an axial position of the fold gear along the length of the spindle to maintain a meshing between the fold gear and a fold drive.

3. The actuator according to claim 1, wherein the end stop is comprised by the shaft and/or disposed on a side wall of the shaft.

4. The actuator according to claim 1, wherein the end stop has a first side wall, a second side wall, a third side wall between the first and second side walls, and a bottom wall.

5. The actuator according to claim 4, wherein the first side wall, the second side wall, and the bottom wall have flat surfaces, and the third side wall has a curved surface.

6. The actuator according to claim 1, wherein the end stop is configured to be disposed in a slot of a shroud, and wherein the shroud is configured to be attached to the housing of the actuator to rotate with the housing.

7. The actuator according to claim 6, wherein the slot of the shroud has a first wall and a second wall, and wherein the first and second walls of the slot are configured to restrict rotation of the shroud relative to the end stop.

8. The actuator according to claim 1, wherein
    the tilt gear, the slide, and the fold gear are mounted on the spindle adjacent to each other; and
    the tilt gear, the slide, and the fold gear are in direct contact with the spindle along a length of the spindle.

9. The actuator according to claim 1, wherein the first axis is perpendicular to the second axis.

10. A rear view device having the mirror head, the base, and the actuator, according to claim 1.

11. The rear view device according to claim 10, wherein the mirror head is configured to rotate with the housing of the actuator about the two axes, and the base is configured to remain stationary.

12. A vehicle with at least one rear view device according to claim 10, with the base being fixedly attached to the vehicle.

* * * * *